J. W. STEVENS.
SEED COOKING APPARATUS.
APPLICATION FILED AUG. 25, 1920.
1,411,591.
Patented Apr. 4, 1922.
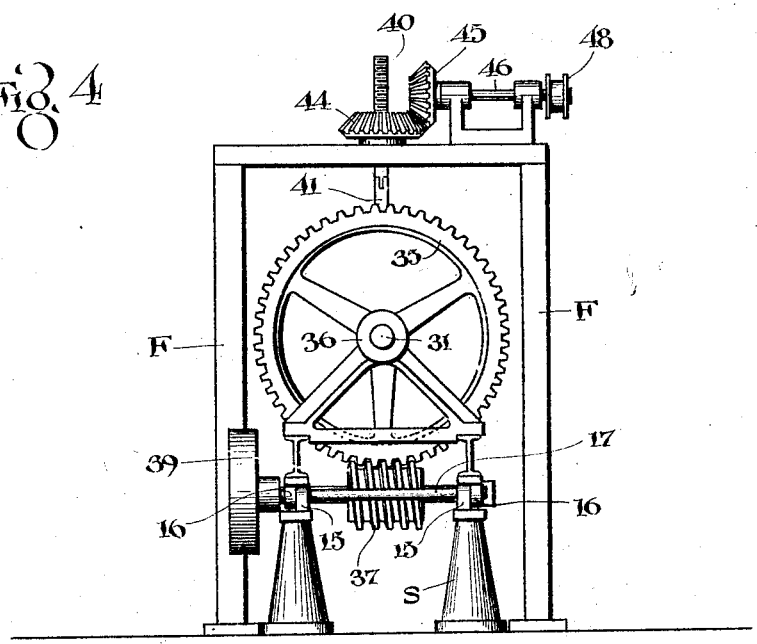
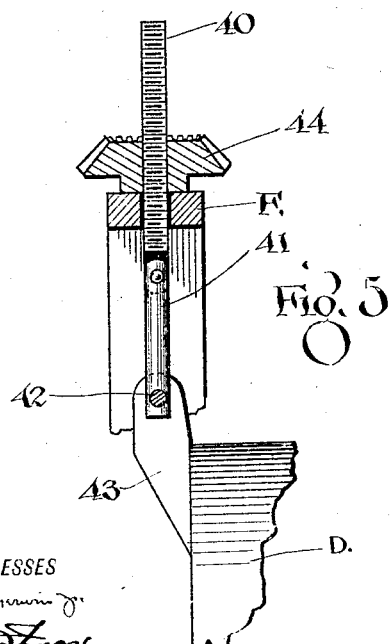
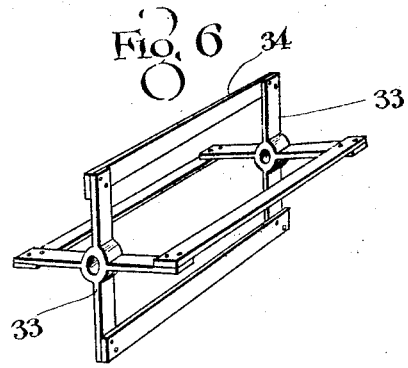
WITNESSES
INVENTOR
James W. Stevens.
BY
ATTORNEYS

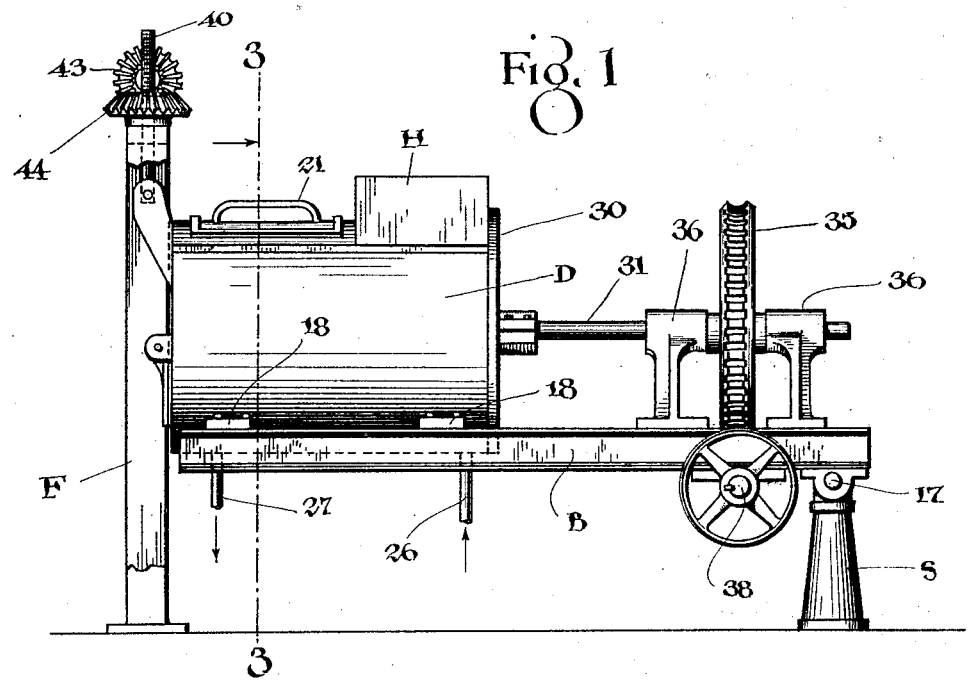
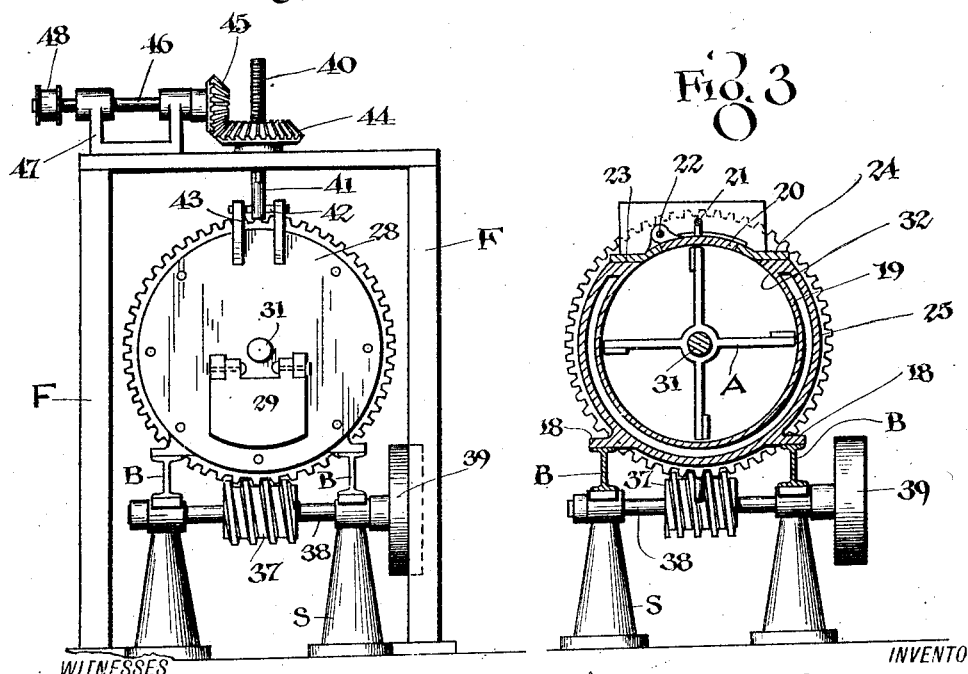

UNITED STATES PATENT OFFICE.

JAMES WHARTON STEVENS, OF CHATTANOOGA, TENNESSEE.

SEED-COOKING APPARATUS.

1,411,591. Specification of Letters Patent. Patented Apr. 4, 1922.

Application filed August 25, 1920. Serial No. 406,015.

*To all whom it may concern:*

Be it known that I, JAMES WHARTON STEVENS, a citizen of the United States, and a resident of Chattanooga, in the county of Hamilton and State of Tennessee, have invented certain new and useful Improvements in Seed-Cooking Apparatus, of which the following is a specification.

My invention relates generally to cooking apparatus and more particularly to apparatus for cooking oil bearing seeds preparatory to extracting the oil therefrom.

A purpose of my invention is the provision of a cooking apparatus of that character which effects a thorough and uniform cooking of each and every seed whereby the oil produced by the subsequent extracting operation greatly exceeds that obtained by apparatus heretofore proposed.

It is also a purpose of my invention to provide a seed cooking apparatus which is constructed to facilitate the introduction and discharge of the seed to and from the apparatus.

I will describe one form of cooking apparatus embodying my invention and will then point out the novel features thereof in claims.

In the accompanying drawings:

Figure 1 is a view showing in side elevation one form of cooking apparatus embodying my invention.

Figure 2 is a view showing in front elevation the apparatus shown in Figure 1.

Figure 3 is a vertical sectional view taken on the line 3—3 of Figure 1.

Figure 4 is a view showing in rear elevation the apparatus shown in Figure 1.

Figure 5 is a fragmentary detail view, partly in section, showing the tilting mechanism of the apparatus shown in the preceding views.

Figure 6 is a detail perspective view of the agitator shown in Figure 3.

Similar reference characters refer to similar parts in each of the several views.

Referring specifically to the drawings and particularly to Figures 1 and 4, S designates a pair of stems upon which are swingingly mounted a pair of parallel spaced beams B by means of ears 15 and 16 formed on the stems and beams, respectively, and through which extend a shaft 17. By reference to Figure 1 it will be seen that the beams B are supported for swinging movement upon the stems at one of their ends while at the opposite end they carry a cooking drum designated generally at D. The cooking drum D is secured to the beams B by means of lips 18 formed integral with the drum as shown in Figure 3 and secured to the beams by means of bolts.

The drum D in the present instance comprises a substantially cylindrical body 19 formed at its upper forward end with an opening adapted to be normally closed by a door 20 carrying a handle 21 and hingedly supported as at 22 upon a plate 23. By reference to Figure 3 it will be noted that the plate 23 is supported upon one edge of the body 19, while the companion plate 24 is supported upon the other edge of the body, and both plates coact to support the door 20 in closed position. At the rear end of the body 19 I provide a charging hopper H into which the seeds are adapted to be stored and removed therefrom from time to time for introduction into the cooking drum through the opening controlled by the door 20.

The cylindrical body 19 is surrounded by an outer body 25 which is spaced from the body 19 so as to provide a chamber therebetween, such chamber constituting the steam jacket for the drum for heating the contents of the drum as will be more fully described hereinafter. As shown to advantage in Figure 1, steam is admitted to the steam jacket through a pipe 26 and is discharged therefrom through a pipe 27, the arrangement of the pipes being such as to effect the proper circulation of the steam throughout the area of the jacket.

The forward end of the drum D is closed by a head 28 formed with a discharge opening controlled by a door 29 hingedly supported upon the head in the manner shown in Figure 2. The rear end of the drum D is closed by a similar head 30 and the heads 29 and 30 are formed with axial openings for the reception of an agitator shaft 31. The interior of the cylindrical body 19 constitutes the cooking chamber and is designated by the numeral 32. Working within the cooking chamber 32 is an agitator designated generally at A and fixed to the shaft 31 for rotation therewith. As shown in Figure 6, the agitator A comprises a pair of spiders 33, the heads of which receive the shaft 31 and are secured thereto in any suitable manner. The rotary arms of the spiders 33 are rigidly connected by longitudinally extending blades 34, any two adjacent blades being disposed at right angles to each other.

The rotation of the agitator A is effected through the medium of a worm 35 fixed to the shaft 31 at a point between hangers 36, the latter serving to support the rear end of the shaft, as will be understood. The hangers 36 are in turn supported upon the beams B so as to move therewith. Meshing with the worm 35 is a worm gear 37 fixed to a shaft 38 supported in suitable bearings carried by the beams B. To one end of the shaft 38 is keyed a pulley 39, and power is adapted to be applied to this pulley for effecting the rotation of the shaft 38 which in turn rotates the shaft 31 through the medium of the gears 35 and 37. For the purpose of tilting the drum D to effect a discharge of its contents and for maintaining the drum in a horizontal position, I provide a mechanism which in the present instance comprises a screw threaded shaft 40 which loosely extends through a suitable opening formed in the horizontal portion of an inverted U-shaped frame F. The lower end of the shaft 40 is bifurcated and pivotally connected to a link 41, the latter in turn being pivotally connected to a pintle 42 supported in ears 43 formed on the head 28. This construction is clearly shown in Figure 5. The shaft 40 extends through and threadedly engages a bevel gear 45 fixed to one end of a shaft 46 journaled in a frame 47. The opposite end of the shaft 46 is provided with a grooved pulley 48 to which power is adapted to be applied for effecting rotation of the shaft 46.

By this arrangement it will be seen that rotation of the shaft 46 effects a vertical feeding of the shaft 40 upwardly or downwardly according as the shaft 46 is rotated in one direction or the other.

In operation, the cooking apparatus normally occupies the position shown in Figure 1 wherein it will be seen that the beams B assume a horizontal position so as to cause the drum D to occupy a corresponding position. The oil bearing seeds to be treated having been placed within the cooking chamber 32, steam is admitted to the steam jacket through the pipe 26 so as to effect a thorough and uniform heating of the chamber wall. During the cooking operation, a slow rotation of the agitator A takes place which causes a thorough mixing of the seeds so that each and every seed comes into contact with the heated wall of the chamber. This enables the seeds to be thoroughly and evenly cooked so that when subsequently subjected to the oil extracting treatment a greater amount of oil can be extracted than is possible with any apparatus with which I am familiar. After the seeds have been cooked for a sufficient period, a discharging of the seed from the drum can be readily effected by a downward feeding of the screw threaded shaft 40. This causes a lowering or tilting of the drum D to an inclined position, it being understood that the drum and beams swing downwardly about the point 17 as a center. When the drum has been moved to an inclined position, the door 29 is opened thus allowing the seed to gravitate from the chamber 32. The drum may be restored to its normal horizontal position by effecting a rotation of the screw threaded shaft 40 in the opposite direction to that described, the beams B again swinging about the point 17 as a center.

Although I have herein shown and described only one form of cooking apparatus embodying my invention, it is to be understood that various changes and modifications may be made herein without departing from the spirit of the invention and the spirit and scope of the appended claims.

What I claim is:

1. A cooking apparatus comprising, a pair of beams mounted for swinging movement on a transverse axis, a drum fixed to the beams, a steam jacket surrounding the drum, an agitator rotatable within the drum, and mechanism for supporting the drum and beams in any adjusted position.

2. A cooking apparatus comprising, a pair of beams mounted for swinging movement about a transverse axis, a drum fixed to the beams, heating means for the drum, said drum having a discharge opening at one end, and mechanism for supporting the drum in a position to prevent discharge of the material to be cooked from the drum and for supporting the drum in another position to effect a discharge of the material therefrom.

3. A cooking apparatus comprising, a pair of beams mounted for swinging movement about a transverse axis, a drum fixed to the beams, a heating jacket surrounding the drum, said drum being formed with a discharge opening, an agitator rotatable within the drum, means for rotating the agitator comprising a shaft, a worm gear fixed to the shaft, a worm meshing with the worm gear, and means for rotating the worm gear, a frame, and means carried by the frame and connected to said drum for supporting the drum in adjusted position and for effecting a tilting of the drum.

4. A cooking apparatus comprising, a drum mounted for swinging movement about a horizontal axis, and mechanism for supporting the drum in adjusted position comprising, a link connected to one end of the drum, a screw threaded shaft connected to said link, a gear threadedly engaging said shaft, and means for rotating said gear whereby a longitudinal movement of said shaft is effected.

5. A cooking apparatus comprising, a pair of standards, beams pivotally connected to the standards, a drum fixed to said beams and having a discharge opening, an agitator rotatable within the drum, a shaft connected to the agitator and supported on said drum and beams, a second shaft supported on the beams and operatively connected to the first shaft, a frame arranged adjacent the free ends of the beams, a screw threaded shaft extending through the frame and operatively connected to the forward end of the drum, and means for rotating the screw threaded shaft to effect a lowering and elevation of the forward end of the drum for the purpose described.

JAMES WHARTON STEVENS.